United States Patent [19]

Hoppman et al.

[11] Patent Number: 5,392,731
[45] Date of Patent: Feb. 28, 1995

[54] WALK-THOUGH FLAT BARN PARLOR

[75] Inventors: David P. Hoppman; Kelvin L. Daleiden, both of Fond du Lac, Wis.

[73] Assignee: A. F. Klinzing Co., Inc., Fond du Lac, Wis.

[21] Appl. No.: 213,614

[22] Filed: Mar. 15, 1994

[51] Int. Cl.⁶ .......................... A01K 1/12; A01K 1/062
[52] U.S. Cl. ................................... 119/14.03; 119/740
[58] Field of Search ................. 119/14.03, 730, 731, 119/738, 739, 740

[56] References Cited

U.S. PATENT DOCUMENTS

| | | | |
|---|---|---|---|
| 3,221,707 | 12/1965 | Pearson | 119/731 |
| 3,513,812 | 5/1970 | Iverson et al. | 119/730 |
| 4,116,166 | 9/1978 | Gofflot | 119/730 |
| 4,357,906 | 11/1982 | Kratky | 119/731 |
| 4,579,084 | 4/1986 | McCan et al. | 119/731 |
| 4,854,268 | 8/1989 | Kipe | 119/14.03 |

FOREIGN PATENT DOCUMENTS 2173386 10/1986 United Kingdom ............... 119/731

*Primary Examiner*—Robert P. Swiatek
*Attorney, Agent, or Firm*—Donald Cayen

[57] ABSTRACT

A walk-through flat barn parlor comprises a number of modular stalls for managing dairy cows. Each module has a frame to which a pair of gates are mounted. The axes of rotation for the gates make compound angles with the vertical such that the gates are biased by gravity to rotate from a closed mode to a ready open mode. A control mechanism is actuated by a cable mechanism from a milking station to unlock the gates for automatic rotation by gravity from the closed mode to the ready open mode. A cow walks to the ready open gates and pushes them to the closed mode, where she is constrained for milking. After completion of milking, the farmer actuates the cable mechanism to unlock the gates and enable the cow to push them to an exit open mode. When the cow has cleared the gates, they automatically rotate by gravity back toward the closed mode. A pawl on a bar connecting the gates co-acts with the control mechanism to enable the gates to rotate past the closed mode all the way to the ready open mode. The cable mechanism includes a reversing mechanism that enables the farmer to actuate the control mechanism in a consistent manner regardless of the side of the stall his milking station is located.

30 Claims, 8 Drawing Sheets

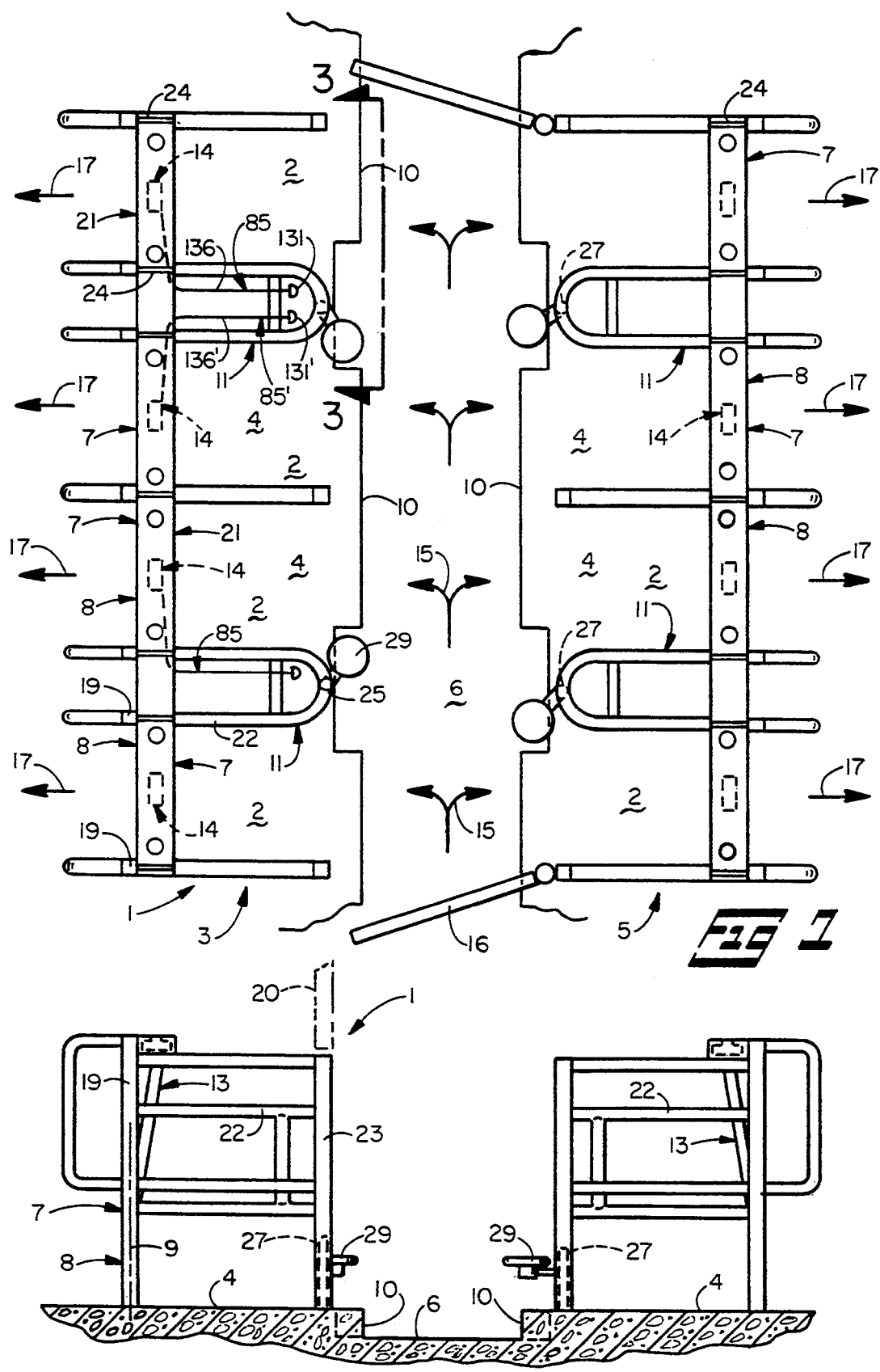

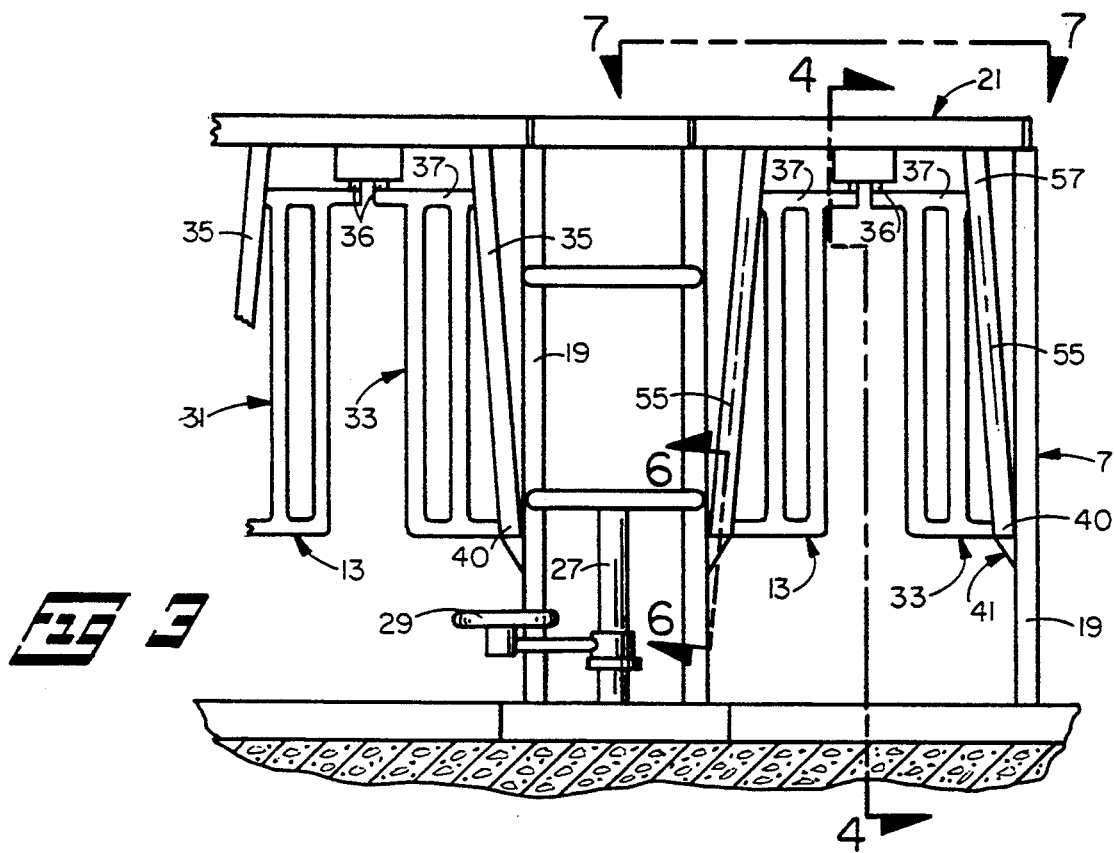
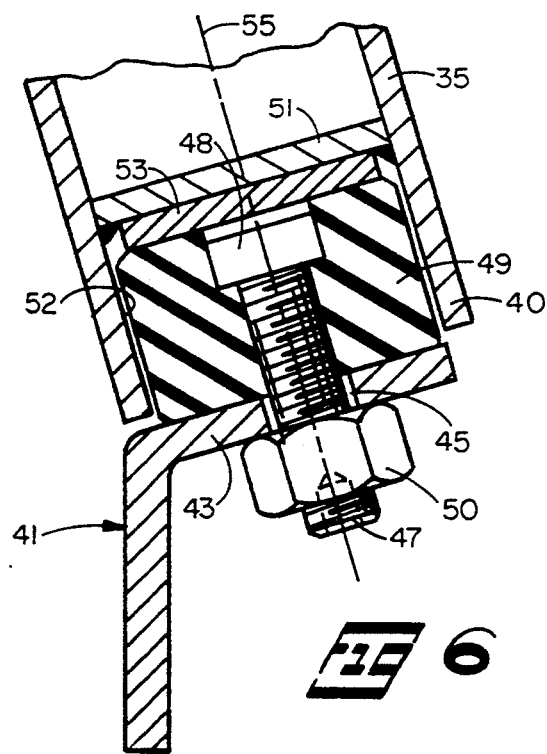

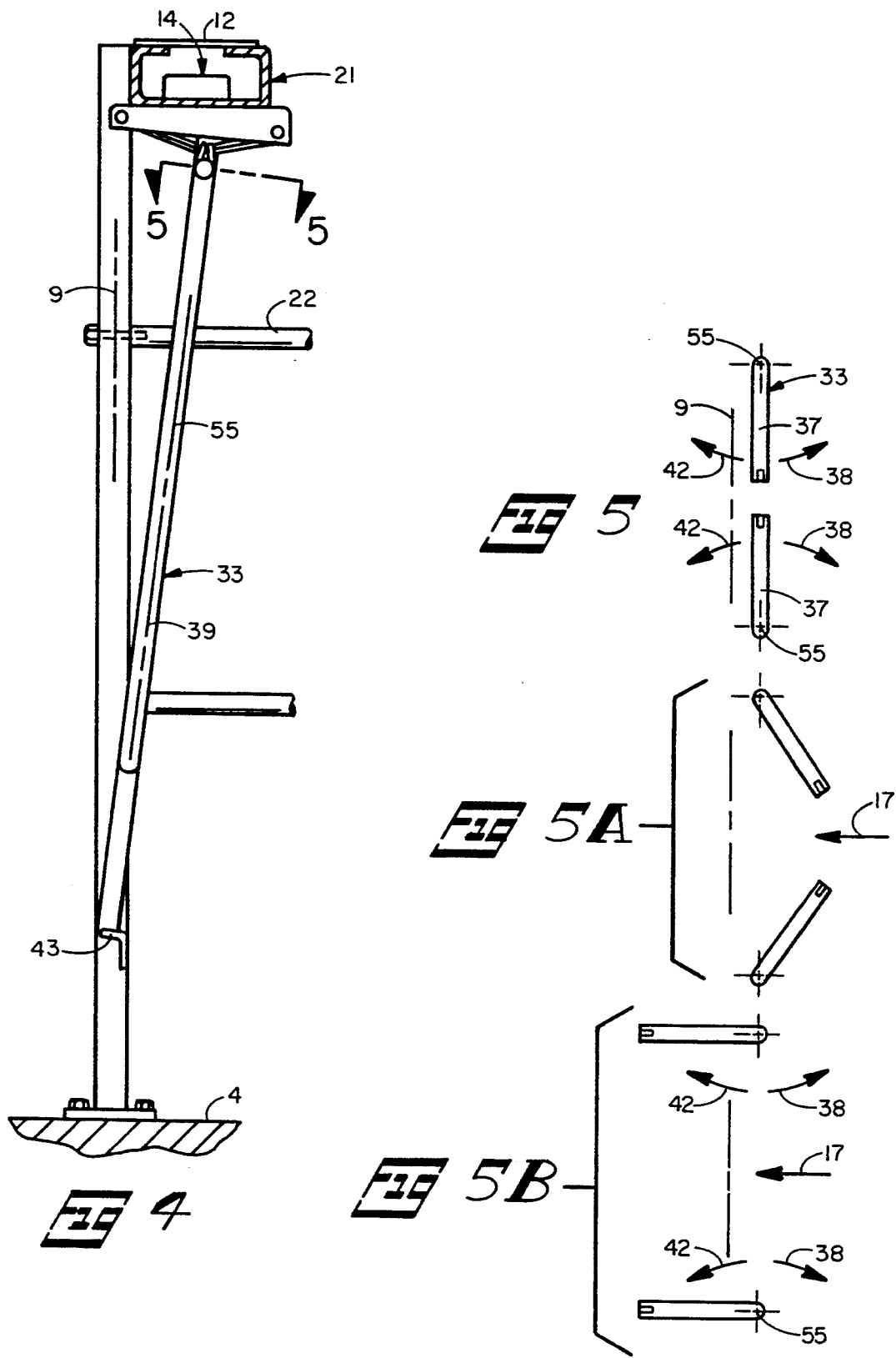

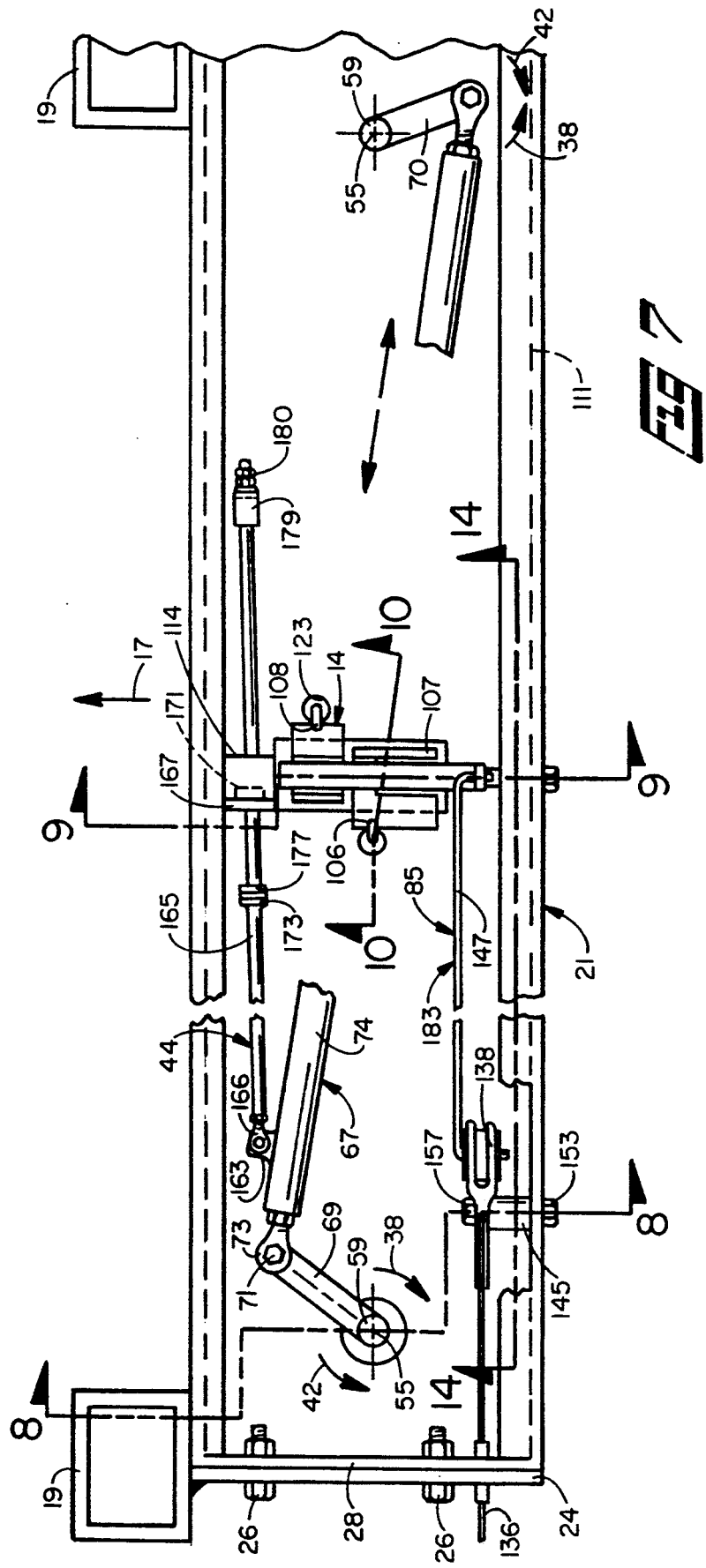

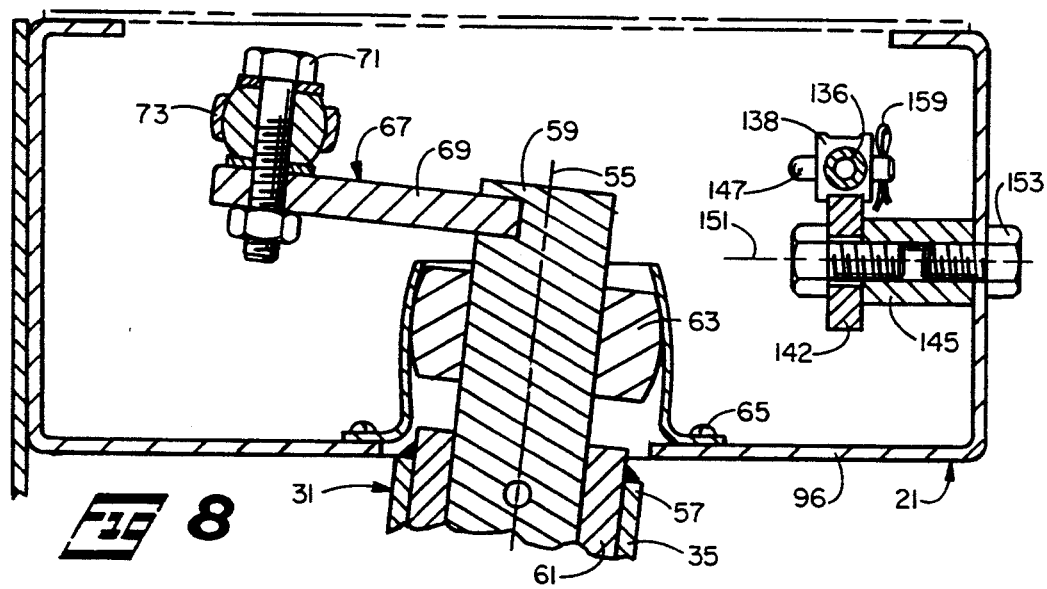
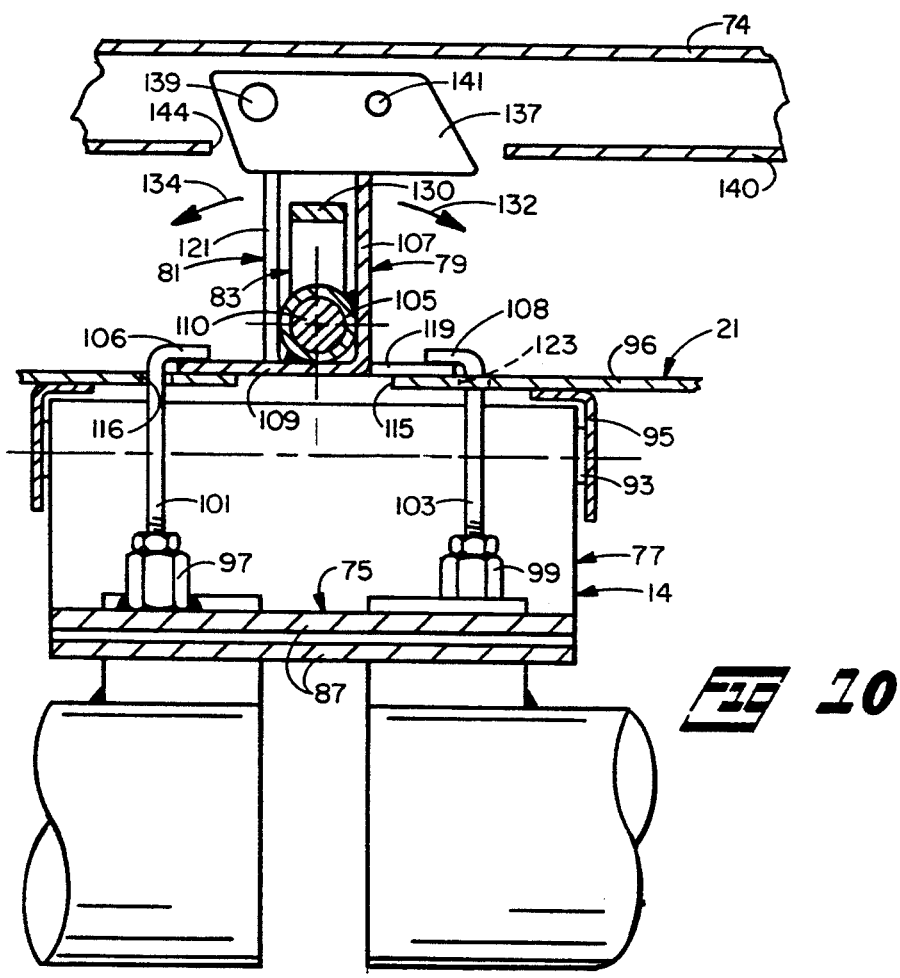

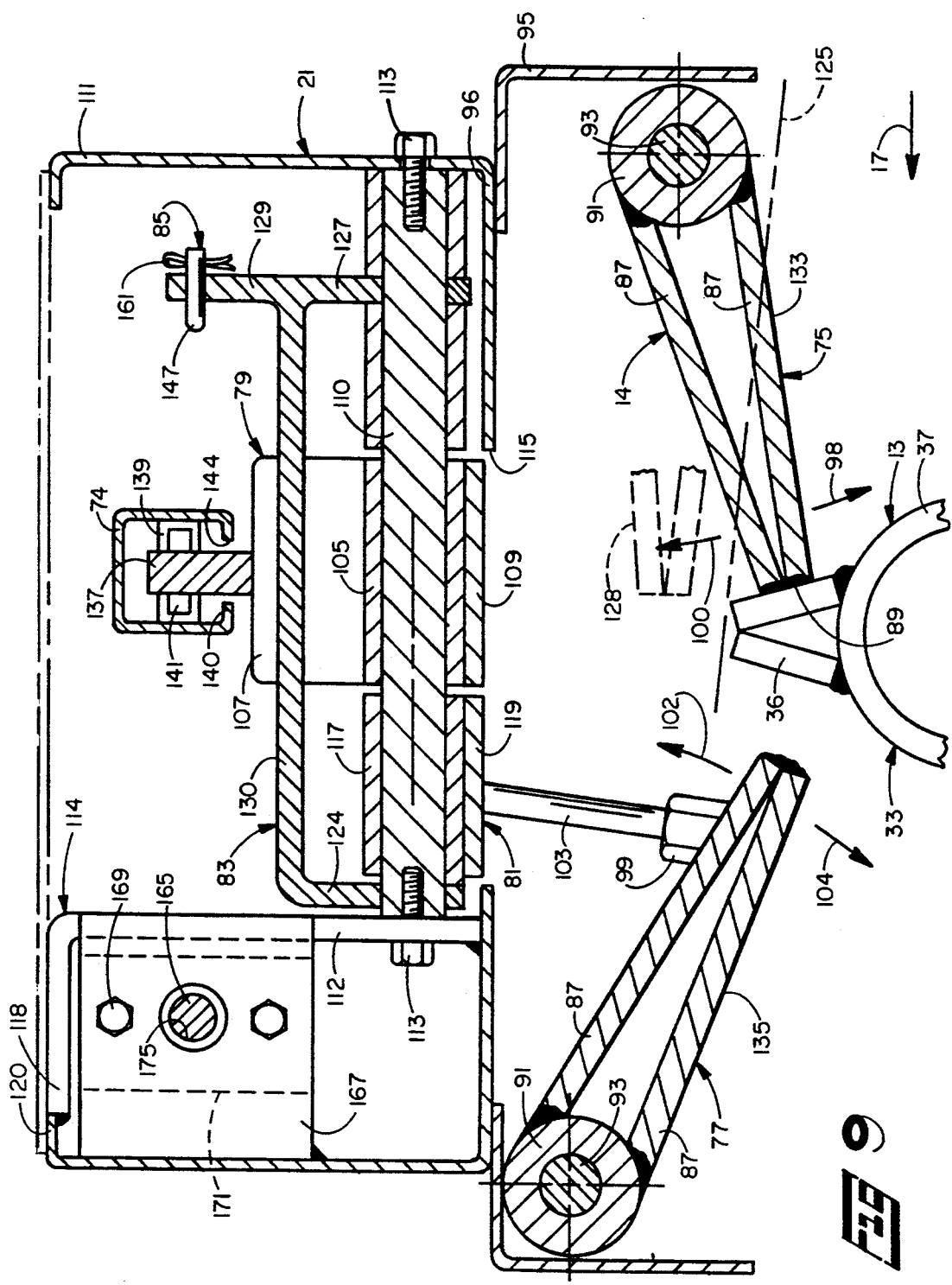

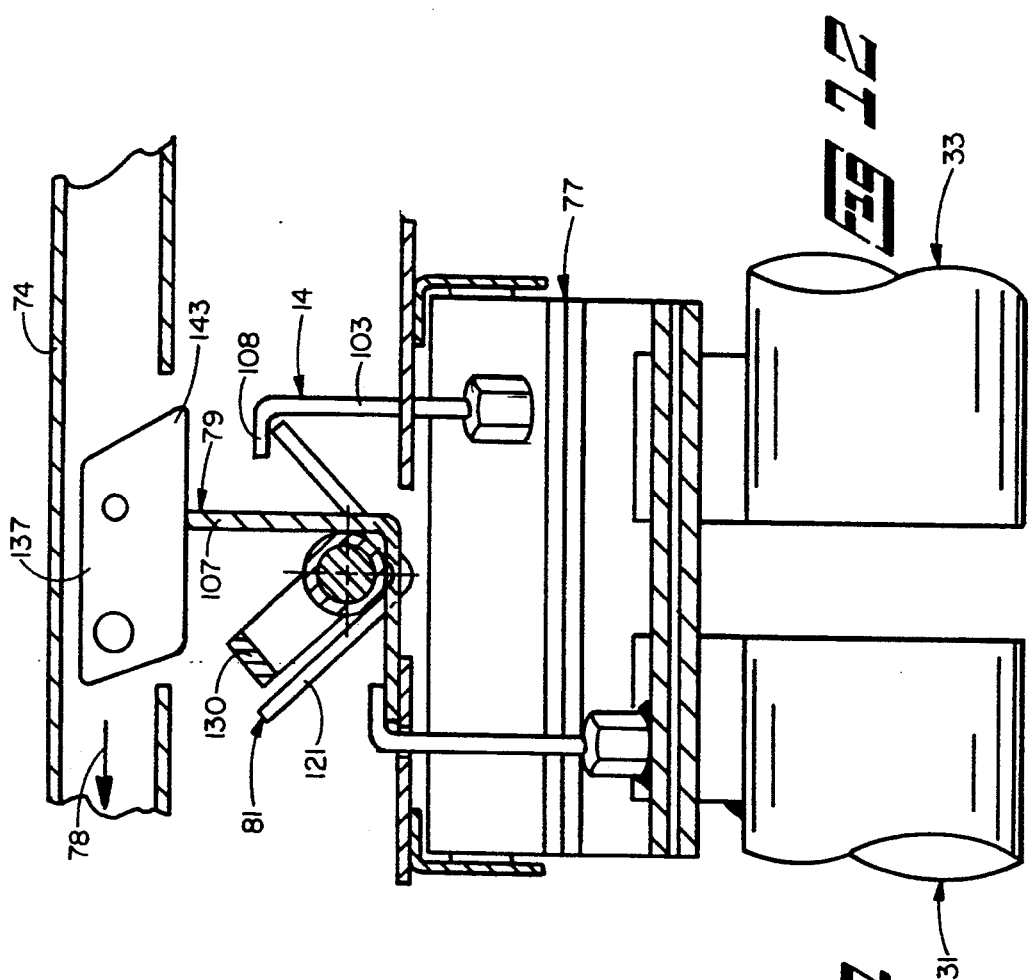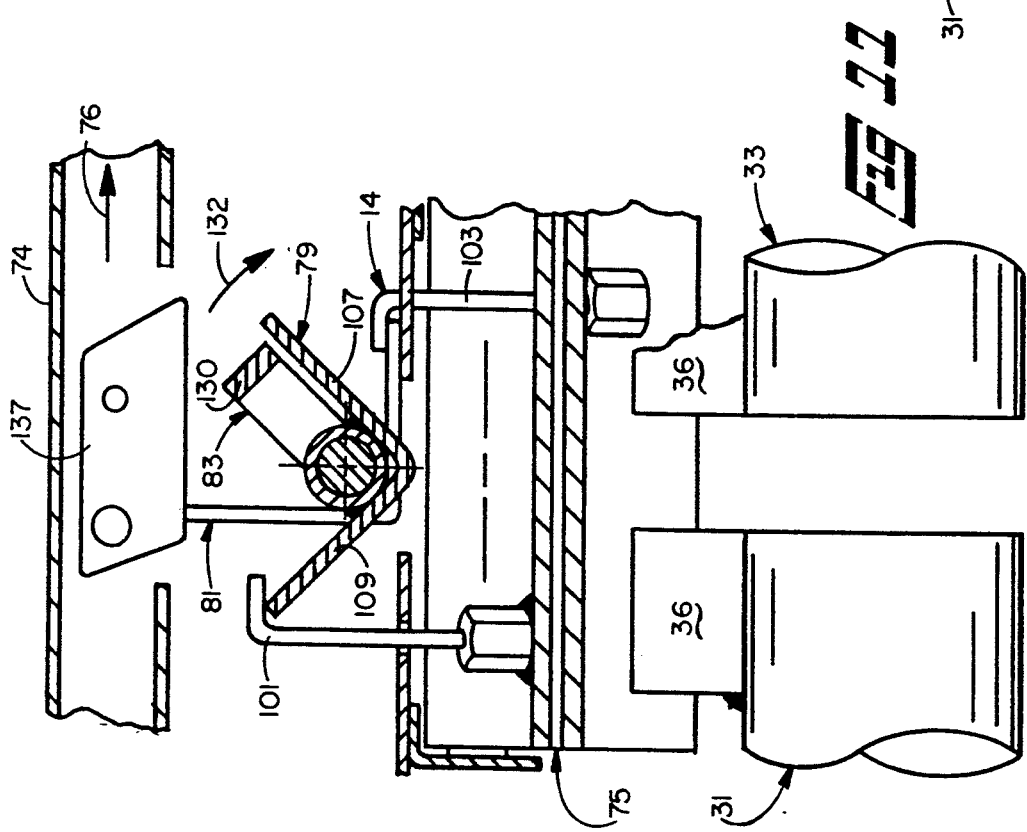

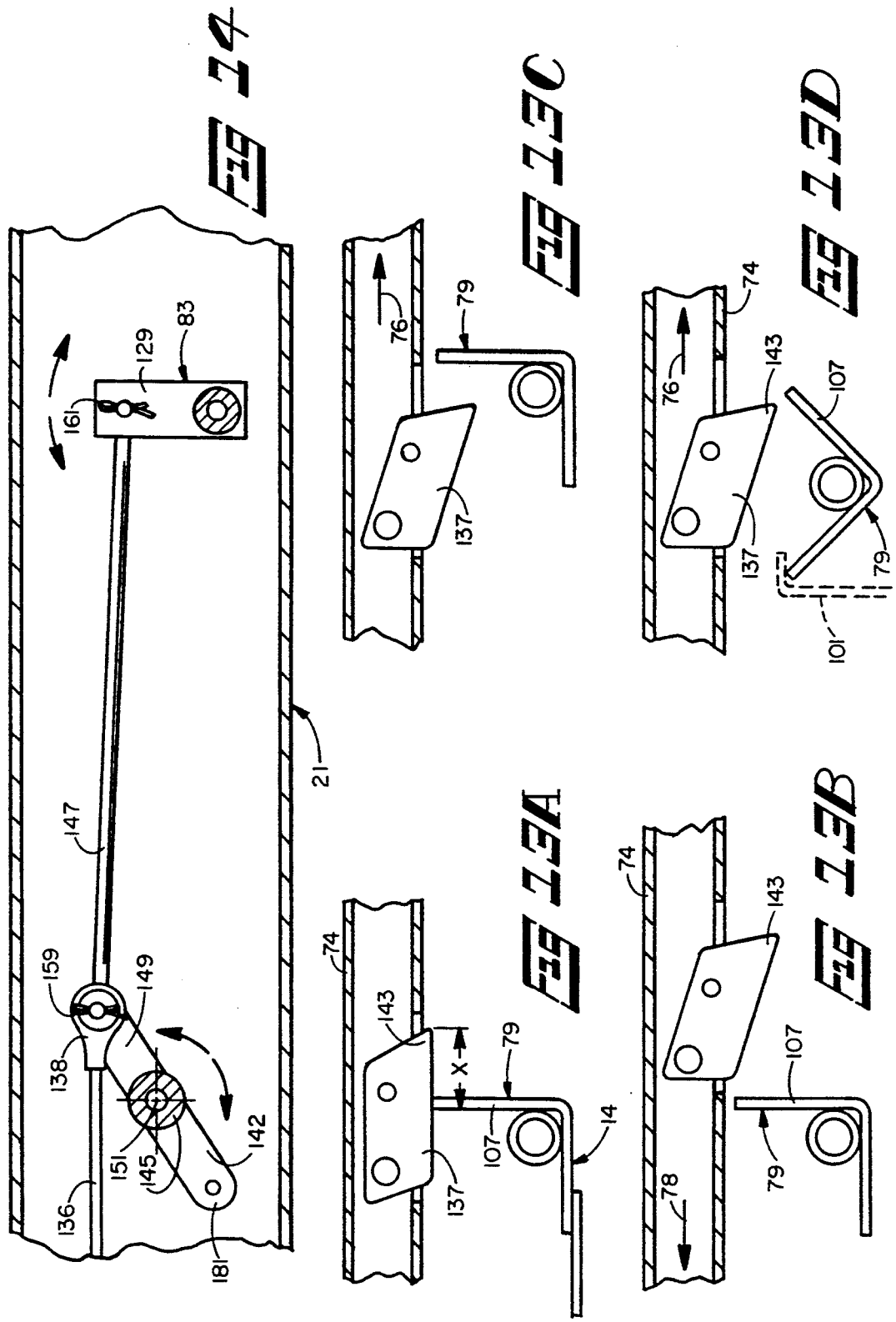

WALK-THOUGH FLAT BARN PARLOR

BACKGROUND OF THE INVENTION

1. Field of the Invention

This invention pertains to agricultural equipment, and more particularly to apparatus useful in animal husbandry.

2. Description of the Prior Art

Handling large animals such as swine and cattle is a difficult and even dangerous job. The animals are far stronger than the persons trying to manage them, so mechanical aids are commonly employed to direct desired animal movements. Examples of large animal managing equipment include various squeeze chutes manufactured by For-Most, Inc. of Hawarden, Iowa, and by Palco, Inc. of Belle Plaine, Iowa.

A very important application of large animal management concerns dairy cows. For efficient milking, the cows must be calmly constrained at specific locations. Various equipment, such as stanchions, have been developed to constrain the cows in place, not only for milking but also for treating them for injury or illness.

In addition to the specific equipment that physically constrains cows at desired places for milking, the general milking environment has undergone continuous development over the years. Many dairy barns now include a pit parlor having stalls in which the cows stand at an elevation higher than that of the farmer. Headgates of various types are employed to firmly constrain the cows in the stalls while they are milked. The headgates are also useful for constraining the cows for medical or other treatment. The milking equipment is integrated into the parlors such that it remains in the same place during the entire milking operation. The idea is to move the cows to and from the milking equipment at the stalls and not move the milking equipment to and from the cows. Another advantage of pit parlors is that the farmer can work without bending and stooping to clean, milk, and treat his cows.

Although pit parlors greatly increase efficiency, they suffer the disadvantage of being very costly to install. Consequently, only relatively large operations can afford them. Moreover, the farmer must remain on his feet during the entire milking operation.

In an effort to obtain the benefits of pit parlors without their expense, flat barn parlors have recently been developed. In flat barn parlors, the farmer and the cows walk on the same barn surface, i.e., the barn floor. Accordingly, a new building or major changes to a barn floor or foundation are not required, which is a substantial cost benefit.

Some milking stalls of flat barn parlors are designed with headgates that open in only one direction. A headgate is operated to accept the head and neck of a cow and then closed and locked during milking or other procedures. For the cow to leave the stall, she must back up after the farmer has unlocked the headgate. That action is undesirable for several reasons. Some animals are reluctant to walk backwards, so they must be prodded to do so. Some cows tend not to walk straight back, so they often bump into the milking equipment. Consequently, the farmer must guide the cow backwards. Since the next cow cannot enter the stall until the previous cow is completely out of the way, congestion at the stall is inevitable. The time necessary for the farmer to clear a cow from the stall is wasted.

A better type of headgate is one that opens in two directions. The headgate opens to a ready position to accept the cow's head and neck, and the headgate locks at a closed position. When the farmer unlocks the headgate, the cow is able to walk forward, forcing the headgate open to an exit position. That design greatly improves cow traffic by eliminating the problems associated with backing a cow out of her stall.

However, prior walk-through headgates are not entirely satisfactory. They tend to remain open after the cows have passed through them, so the farmer must leave his milking station to close them. That activity represents non-productive time. In an attempt to make headgates self-closing, different types of spring and pneumatic mechanisms have been employed. The prior spring and pneumatic actuated headgates have not proven completely reliable. Further, the springs or pneumatic devices swing the headgates with undesirably high speeds such that they bang closed with a noisy shock. The farmer still must manually open a closed headgate to the ready position to accept the next cow. Finally, the springs exert uncomfortable forces on the cow's shoulders, sides, and pins as she pushes the headgate open and walks through it when leaving the stall.

Thus, a need exists for improvements in animal headgates.

SUMMARY OF THE INVENTION

In accordance with the present invention, a walk-through flat barn parlor is provided that greatly increases the efficiency of managing dairy cows and other large animals. This is accomplished by apparatus that includes headgates that automatically operate by gravity from an exit open mode to a ready open mode.

The walk-through flat barn parlor preferably comprises several modular stalls that are arranged to suit the space available in a barn or similar enclosure. Each modular stall comprises a frame and a headgate hinged to the frame. Dividers are mounted to the frames of adjacent modules. The dividers stationarily support milking or other equipment.

The headgate of each stall module comprises two separate gates, each hinged to the frame for rotation about respective axes of rotation. The gates rotate together in opposite directions between the ready open mode, the exit open mode, and a closed mode intermediate the ready open and exit open modes. In the ready open mode, the gates are partially opened toward an upstream direction from which a cow walks to the stall. In the exit open mode, the gates are fully opened in a downstream direction taken by the cow when she leaves the stall. The operation of the gates is controlled by a control mechanism actuated by the farmer from a milking station by means of a manually operated cable mechanism.

The control mechanism is assembled to the frame and comprises first and second latches, first and second actuating angles, and a lever. The first and second latches rotate about respective horizontal axes between raised and lowered positions. When the latches are in their lowered position, they capture between them tabs on the gates in a manner that locks the gates in the closed mode. When either latch is in a raised position, the gates can rotate past that latch.

It is a feature of the present invention that the gates are biased by gravity to rotate from the closed mode toward the upstream direction to the ready open mode. For that purpose, when the gates are in the closed mode, they lie in a plane that makes an angle of several degrees to the vertical. The plane of the gates is directed upwardly and toward the upstream direction.

To unlock the gates and enable them to rotate from the closed mode to the ready open mode, the first latch is rotated to its raised position, thus removing the restraint of that latch from the gate tabs. To rotate the first latch to its raised position, the cable mechanism is momentarily actuated in a first direction by the farmer. That action tilts the lever to a first actuated attitude and causes the first actuating angle to pivot to an actuated condition. Pivoting the actuating angle lifts a finger joined to the first latch, thereby rotating the first latch to its raised position. At the raised position, the latch is clear of the gate tabs. The gates then automatically rotate by gravity toward the upstream direction to the ready open mode. The amount of gate rotation at the ready open mode is adjustably governed by a stop mechanism. Release of the cable mechanism after actuation allows the first latch to rotate by gravity back to its lowered position.

To reclose and lock the gates, it is necessary merely to push them to the closed mode, which is normally done by a cow entering the stall. An important aspect of the present invention is that the cow's movement in the downstream direction within the stall is carefully controlled such that she walks sufficiently far into the stall to lock the gates at the closed mode. To assure that the cow does walk downstream sufficiently far, the dimension from the gates to the back of a raised platform of the stall is carefully controlled. The tabs on the closing gates cam the first latch from its lowered position to its raised position until the tabs move past the first latch; then the first latch rotates again by gravity to its lowered position, where it cooperates with the second latch to again capture the gate tabs and lock the gates.

To enable the gates to rotate from the closed mode to the exit open mode, the farmer actuates the cable mechanism in a second direction. Doing so tilts the lever to a second actuated attitude and causes the lever to pivot the second actuating angle to an actuated condition and raise a finger joined to the second latch. The second latch rotates to its raised position and clears the gate tabs. The gates can then be pushed to the exit open mode by a force that normally comes from a cow leaving the stall in the downstream direction. The amount of rotation of the gates to the exit open mode is governed by the stop mechanism. After the farmer releases the cable mechanism, the second latch rotates by gravity to its lowered position.

In carrying out the present invention, the axes of rotation of the respective gates converge upwardly by a few degrees. Consequently, the gates are biased by gravity to start rotation from the exit open mode back toward the closed mode. It follows that as soon as the cow has passed by the open gates, they automatically rotate by gravity back from the exit open mode toward the closed mode. The gate tabs cam the second latch to its raised position to enable the gates to reach the closed mode.

In the preferred embodiment, the control mechanism is designed such that the farmer actuates the cable mechanism in the same direction for selectively unlocking the gates for rotation to either the ready open mode or the exit open mode regardless of where the cable mechanism is installed within the walk-through flat barn parlor. That is achieved by a reversing mechanism composed of a link that oscillates within the frame and a rod connecting a first end of the link to the control mechanism lever. One end of a flexible cable is assembled to either the first or a second end of the link. The placement of the link relative to the control mechanism and the link end to which the flexible cable is assembled to the link depends on the location of the cable relative to the stall. The other end of the flexible cable has a hand knob for actuation by the farmer.

Further in accordance with the present invention, the gates do not become locked at the closed mode when they rotate from the exit open mode to the closed mode. Rather, a pawl in a bar that connects the gates to each other strikes the first actuating angle as the gates approach the closed mode. The pawl pivots the first actuating angle in a manner identical to the pivoting thereof by actuation of the cable mechanism. The pivoting first actuating angle lifts the finger joined to the first latch and thereby rotates the first latch to its raised position. As a result, the gate tabs pass the first latch without contact therewith, and the gates rotate completely to the ready open mode.

In normal use, the farmer actuates the cable mechanism only to release a cow from the locked gates. As the cow walks forwardly in the downstream direction, she opens the gates to the exit open mode. As soon as she clears the gates, they automatically rotate by gravity to the ready open mode. The next cow rotates the gates to the closed mode, where they become locked so that the cow is restrained until the farmer again actuates the control mechanism to release the cow.

The method and apparatus of the present invention, using gravity to automatically rotate a headgate between exit open and ready open modes, thus enables a farmer to manage the movements of large animals with ease and efficiency. A control mechanism is actuated a single time to both release the animal from the headgate and to ready the headgate without manual manipulation thereof for accepting and constraining the next animal.

Other advantages, benefits, and features of the present invention will become apparent to those skilled in the art upon reading the detailed description of the invention.

BRIEF DESCRIPTION OF THE DRAWINGS

FIG. 1 is a top view of the walk-through flat barn parlor of the present invention.

FIG. 2 is a front view of FIG. 1.

FIG. 3 is a view on an enlarged scale taken along line 3—3 of FIG. 1 and rotated 90 degrees clockwise.

FIG. 4 is a partial view on an enlarged scale taken along line 4—4 of FIG. 3.

FIG. 5 is a simplified view taken along line 5—5 of FIG. 4 showing the headgate in the closed mode.

FIG. 5A is a view similar to FIG. 5, but showing the headgate in the ready open mode.

FIG. 5B is a view similar to FIG. 5, but showing the headgate in the exit open mode.

FIG. 6 is a cross sectional view on an enlarged scale taken along line 6—6 of FIG. 3.

FIG. 7 is a partially broken view on an enlarged scale taken along line 7—7 of FIG. 3.

FIG. 8 is a cross sectional view on an enlarged scale taken along line 8—8 of FIG. 7.

FIG. 9 is a cross sectional view on an enlarged scale taken along line 9—9 of FIG. 7.

FIG. 10 is a cross sectional view on enlarged scale taken along line 10—10 of FIG. 7.

FIG. 11 is a view similar to FIG. 10, but showing the control mechanism actuated to enable the headgate to rotate to the ready open mode.

FIG. 12 is a view similar to FIG. 10, but showing the control mechanism actuated to enable the headgate to rotate to the exit open mode.

FIGS. 13A–13D are simplified schematic drawings of the operational relation between the actuating angles and the pawl of the control mechanism.

FIG. 14 is a view on an enlarged scale taken along line 14—14 of FIG. 7.

DETAILED DESCRIPTION OF THE PREFERRED EMBODIMENTS

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

GENERAL

Referring first to FIGS. 1–3, a walk-through flat barn parlor 1 is illustrated that includes the present invention. The walk-through flat barn parlor 1 is particularly useful for managing dairy cow traffic during milking operations. However, it will be understood that the invention is also eminently suited for handling large non-dairy animals while nursing, breeding, or otherwise treating them.

For illustrative purposes the walk-through flat barn parlor 1 is depicted as having a number of stalls 2 arranged in two parallel rows 3 and 5. The rows 3 and 5 of stalls 2 are separated by a central aisle 6. The stalls have raised platforms 4 that are approximately six inches to nine inches higher than the level of the central aisle 6. Each platform 4 has a vertical wall 10 adjacent the central aisle. Each row of stalls comprises a number of stall modules 8 joined end to end. Each module 8 includes a frame 7 that defines a generally vertical plane 9. The horizontal distance from the plane 9 to the walls 10 of the stall platforms 4 is carefully controlled. The exact dimension will vary depending on the size and type of animals managed by the walk-through flat barn parlor 1. As an example, for Holstein dairy cows, the dimension is between approximately 62 inches and 67 inches. Dividers 11 are mounted to the frames 7 of adjacent stall modules. The milking equipment, not shown but well known in the art, is stationarily located within the dividers 11. Each stall module also includes a headgate 13. Each stall of the walk-through flat barn parlor thus has a headgate 13 at one end, and the other end of the stall is open to the central aisle 6.

Cows typically enter the walk-through flat barn parlor 1 through a gate 16 and walk into the central aisle 6. From the central aisle, the cows walk from an upstream direction to any empty stall 2, as is indicated by the arrows 15.

The headgate 13 of each stall 2 is selectively controlled by an associated control mechanism 14 to alternately gently receive and constrain a cow by her neck, and to release the cow. The control mechanism 14 is assembled in the frame 7 above the associated headgate 13, but the control mechanism is actuated by the farmer from his milking station at a divider 11 by means of a cable mechanism 85. While the cow is constrained, she can be milked or otherwise treated. When milking is completed, the headgate is controlled to release the cow for walking forwardly in a downstream direction indicated by arrows 17 away from the walk-through flat barn parlor 1. Another cow can then immediately enter the stall from the central aisle 6 to take the place of the departed cow.

FRAME AND DIVIDERS

In the illustrated construction, the frame 7 of each stall module 8 is made up of two upright posts 19 lying generally in the vertical plane 9. The lower ends of the posts 19 are firmly anchored to the platform 4 by any suitable means. The frame further includes a side brace 23 bolted or otherwise secured to each post. The braces 23 are also anchored to the platform 4, and, if convenient, they may also be secured to existing vertical barn supports 20. A vertically oriented plate 24 is welded to the upper end of each post. Also see FIG. 7. Extending between and secured to the plates 24 is an open top housing 21, which includes a cover 12. Preferably, the housing 21 is secured by end walls 28 thereof to the plates 24 by conventional fasteners 26.

Mounted to the posts 19 of the modules 8 are the dividers 11. The dividers tie the modules together and space them along the rows 3 and 5 of the walk-through flat barn parlor 1. The dividers are preferably manufactured from round steel tubes 22 that are bent into a loop. The free ends of the tubes 22 are mounted to the frame posts of adjacent modules, and the tube bent ends 25 extend toward the central aisle 6. Vertical legs 27 help support the tubes 22. A swivelable stool 29 of adjustable height is supported from the vertical leg 27 of each divider. As mentioned, well known milking equipment, prepping equipment, and related supplies are installed within the dividers.

HEADGATE

Each of the headgates 13 of the walk-through flat barn parlor 1 is comprised of two symmetrical gates 31 and 33. Each gate 31 and 33 has a long tube 35 that is supported at its lower end 40 on an associated post 19 of the frame 7 and at its upper end 57 by the housing 21. Each gate also has a top horizontal tube 37. Near the free end of each top horizontal tube 37 is welded an upstanding tab 36.

The gates 31 and 33 rotate together in opposite directions about respective axes 55 as is illustrated in FIGS. 5, 5A, and 5B. In FIG. 5, the gates are in a closed mode such that their respective top tubes 37 are parallel to the plane 9. In FIG. 5A, the gates have rotated in the directions of arrows 38 to a ready open mode, whereat they are partially open toward the central aisle 6 of the walk-through flat barn parlor 1 (FIG. 1). When in the ready open mode, the gate top tubes 37 make an angle of approximately 35 degrees with the plane 9. In FIG. 5B, the gates have rotated in the directions of arrows 42 to an exit open mode. In the exit open mode, the gates are fully opened in the downstream direction 17 away from the central aisle, and the top tubes make an angle of approximately 90 degrees with the plane 9. The location of the gates at the exit open and ready open modes is governed by a stop mechanism 44 (FIG. 7) to be described presently.

It is a feature of the present invention that the gates 31 and 33 are biased by gravity to rotate from the closed mode to the ready open mode. Looking especially at FIGS. 4, 6, and 8, the axes of rotation 55 of the gates make an angle with the plane 9 such that the axes lean upwardly toward the central aisle 6 of the walk-through flat barn parlor 1. The angle of the axes 55 relative to the plane 9 may be between approximately five and eight degrees; an angle of six degrees works very well. Consequently, when the gates are in the closed mode, they lie in a plane 39 that is not parallel to the plane 9 of the frame 7. Rather, the plane 39 also leans upwardly toward the central aisle at the same angle as the axes of rotation 55.

Similarly, the gates 31 and 33 are biased by gravity to rotate from the exit open mode to the closed mode. It will be noticed from FIG. 3 that the axes of rotation 55 of the gates 31 and 33 converge upwardly. The angle of convergence shown is exaggerated for clarity; the actual included angle of convergence is preferably between approximately two and six degrees, with two degrees being satisfactory. The axis of rotation 55 of each gate tube 35 thus makes a compound angle relative to the vertical: a six degree angle with respect to the plane 9 in directions perpendicular to that plane, and a one degree angle in directions parallel to that plane.

To support the gates 31 and 33 at the six degree and one degree compound angles, the lower end 40 of the tube 35 of each gate is rotatably supported on an associated bracket 41 that is welded or otherwise attached to a frame post 19. The bracket 41 has a leg 43 that make a six degree angle with the vertical in directions perpendicular to the plane 9 and a one degree angle with the vertical in directions parallel to the plane 9. The bracket leg 43 defines a slot 45 that accepts a screw 47. The screw 47 has head 48. The screw passes through a cylindrical plug 49. The plug 49 is made of a synthetic material such as reprocessed polystone M plastic. A nut 50 threaded onto the threads of the screw 47 firmly holds the synthetic plug 49 to the bracket leg 43. A socket in the threaded end of the screw 47 enables the nut 50 to be turned tightly onto the screw threads. The lower end 40 of the tube 35 includes a disk 51 welded to the interior of the tube 35 to create a recess 52. The plug is placed into the tube recess 52, with a washer 53 interposed between the plug and the disk 51. In that manner, the lower end 40 of the tube 35 is mounted to the frame for rotation about the plug. Merely by loosening the nut 50, the lower end of the gate and the plug can be slid out from the bracket 41.

The upper end 57 of the tube 35 of each gate 31, 33 is supported in the housing 21, as best shown in FIGS. 7 and 8. For that purpose, a short shaft 59 is adjustably held within a bushing 61 that is welded to the tube upper end 57. The shaft 59 is journaled in a conventional spherical flange bearing 63, which is attached by fasteners 65 to the housing floor 96. The brackets 41, plugs 49, and spherical flange bearings 63 thus cooperate to define the axes of rotation 55 of the gates that make the compound angles of six degrees and one degree with the vertical.

To synchronize rotation of the two gates 31 and 33 of the headgate 13 in opposite directions, the tubes 35 of the gates are connected to each other by a linkage 67. The linkage 67 comprises two arms 69, 70 welded each to a shaft 59. The free ends of the arms 69 are connected, as by a screw, washer, spacer, and nut collectively shown at reference numeral 71, to the bearing of a spherical rod end 73. The threaded ends of the spherical rod ends 73 are adjustably threaded into opposite ends of a long connecting bar 74. Thus, the gates rotate together and in the opposite directions of arrows 38 and 42. We have found that the angles between the gate top tubes 37 and the arms 69 and 70 are important. In FIG. 7, the linkage 67 is shown in its position when the gates are in the closed mode. In that situation, the arm 69 makes an angle of approximately 55 degrees with the gate top tubes, and the arm 70 makes an angle of approximately 65 degrees with the gate top tubes, with the arms 69 and 70 lying on opposite sides of the connecting bar 74.

As best shown in FIG. 7, the connecting bar 74 translates generally in the direction of arrow 76 when the gates rotate in the directions of arrows 38. The connecting bar translates generally in the direction of arrow 78 when the gates rotate in the directions of arrows 42.

CONTROL MECHANISM

The operation of the headgate 13 of each stall module 8 is controlled by the control mechanism 14. Looking especially at FIGS. 7, 9, and 10, the control mechanism is assembled to the housing 21 and is comprised of first and second latches 75 and 77, respectively, first and second actuating angles 79 and 81, respectively, and a lever 83. The latches 75 and 77 are acted upon by the actuating angles 79 and 81 under the influence of the lever 83 and a cable mechanism 85 to selectively prevent or allow rotation of the gates 31 and 33.

In the illustrated construction, each latch 75 and 77 is comprised of a pair of flat plates 87 welded to each other along one edge 89 and at their opposite edges to a tube 91. The tube 91 of each latch fits freely over a respective horizontal shaft 93 that is supported on its opposite ends in the walls of an open bottom box 95. The box 95 is bolted to the underside of the floor 96 of the housing 21. The latch 75 is thus free to rotate about a horizontal axis in the directions of arrows 98 and 100, and the latch 77 is free to rotate in the directions of arrows 102 and 104. Gravity tends to rotate latch 75 in the direction of arrow 98 and latch 77 in the direction of arrow 104. A high nut 97 is welded to the latch 75, and a similar high nut 99 is welded to the latch 77. Adjustably screwed into the high nut 97 of the latch 75 is one end of a first finger 101; the other end of the finger 101 forms a hook 106. A jam nut holds the finger 101 in place. A similar finger 103 with a hook 108 is screwed into the high nut 99.

The first actuating angle 79 is comprised of a tube 105 and a pair of legs 107 and 109. The legs 107 and 109 are perpendicular to each other and are fixed to the tube 105. The tube 105 is supported on a shaft 110. In turn, the shaft 110 is supported, as by screws 113, between a side wall 111 of the housing 21 and the vertical leg 112 of an angle 114. The lower end of the angle leg 112 is welded to the housing floor 96. The other angle end 118 is welded to a top flange 120 of the housing.

In FIG. 10, the first actuating angle 79 is shown in a normal condition, whereat the leg 109 is horizontal and the leg 107 is vertical. Counterclockwise rotation of the first actuating angle with respect to FIG. 10 is prevented by contact of the leg 109 with the housing floor 96. The finger 101 passes through a hole 116 in the housing floor. The finger hook 106 overlies the leg 109 of the first actuating angle. Thus, the first actuating angle and the finger 101 cooperate to prevent the first latch from rotating in the direction of arrow 98 past a lowered position as shown in FIG. 9. That is, the first actuating angle and the finger 101 cooperate to retain the latch 75 at its lowered position against rotation due to gravity in the direction of arrow 98 when the first actuating angle is in its normal condition.

The second actuating angle 81 has a tube 117 that is free to rotate over the shaft 110. A first leg 119 of the second actuating angle is horizontal and a second leg 121 is vertical when the second actuating angle is in a normal condition as shown in FIGS. 9 and 10. Clockwise rotation of the second actuating angle with respect to FIG. 10 is prevented by contact between the leg 119 and the housing floor 96. The finger 103 passes through a hole 123 in the housing floor. The hook 108 of the finger 103 overlies the leg 119 of the second actuating angle. Consequently, the second actuating angle and the finger 103 cooperate to retain the latch 77 in the lower position thereof of FIG. 9 against rotation due to gravity in the direction of arrow 104 when the second actuating angle is in its normal condition. There is an opening 115 in the housing floor 96 under the actuating angles 79 and 81 that permits pivoting of the actuating angles.

The lever 83 is preferably h-shaped, having a first leg 124, a second leg 127, a cross leg 130, and an upstanding bar 129. The first and second legs 124 and 127, respectively, are supported for rotation on the shaft 110. In FIG. 10, the lever is shown in a normal attitude.

When the latches 75 and 77 are in their respective lowered positions of FIG. 9, they capture between their respective free ends 89 the tabs 36 on the top tubes 37 of the gates 31 and 33. The latches are so located that the gates are in their closed mode of FIG. 5 when the tabs are captured between the latches. Because of the six degree angle that the plane 39 of the closed gates makes with the vertical, the gates tend to rotate by gravity about their respective axes 55 toward the ready open mode of FIG. 5A. Consequently, the gate tabs 36 bear against the latch 75 when the gates are in the closed mode.

To enable the gates 31 and 33 to rotate from the closed mode to the ready open mode, the latch 75 is rotated about its shaft 93 in the direction of arrow 100 to a raised position as shown by phantom lines 128, FIG. 9. Raising the latch 75 is achieved by pivoting the first actuating angle 79 in a clockwise direction, arrow 132, relative to FIG. 10 to an actuated condition as shown in FIG. 11. Pivoting the first actuating angle to its actuated condition causes the leg 109 thereof to lift the finger 101 and thus rotate the latch 75 to its raised position. The first actuating angle, finger, and latch are so dimensioned that approximately a 45 degree pivoting of the actuating angle raises the latch sufficient to clear the gate tabs 36. Accordingly, the gates become unlocked to automatically rotate by gravity in the directions of arrows 38 in FIG. 5 to the ready open mode. In FIG. 9, the phantom line 125 represents the plane of the tops of the tabs as the gates rotate.

To enable the headgate 13 to rotate to the exit open mode of FIG. 5B from the closed mode of FIG. 5, the second actuating angle 81 is pivoted counterclockwise with respect to FIG. 10 to the actuated condition of FIG. 12. Pivoting the second actuating angle lifts the finger 103 by its hook 108 and thereby rotates the second latch 77 in the direction of arrow 102, FIG. 9, to its raised position. The gates 31 and 33 can then be manually pushed to rotate them in the directions of arrows 42, FIG. 5, to the exit open mode of FIG. 5B.

STOP MECHANISM

To govern the location of the headgate 13 when it is in the ready open mode of FIG. 5A and in the exit open mode of FIG. 5B, the stop mechanism 44 forms a part of the modular stall 8. The operation of the stop mechanism is best understood upon reference to FIGS. 7 and 9. A lug 163 is fixed to the connecting bar 74 near one of its ends. Welded or otherwise attached to the angle 114 and to the housing 21 is a flat plate 167. On the side of the plate 167 opposite the lug 163 is fastened, as by screws 169, a guide bumper 171. The bumper 171 may be manufactured from the same reprocessed polystone M synthetic plastic material as the plugs 49 used to guide the lower ends 40 of the gates 31 and 33 (FIG. 6). The bumper 171 and the plate 167 have concentric holes therethrough. The hole in the bumper is shown at reference numeral 175.

One end of a stop rod 165 is adjustably and swivelably connected to the lug 163 by means of a threaded clevis 166. The stop rod 165 passes through and is loosely guided in the hole 175 in the bumper 171. The hole in the plate 167 provides clearance for the stop rod.

Welded to the stop rod 165 between the lug 163 and the angle 114 is a collar 173. A pair of sealing washers 177 are loosely placed on the stop rod between the collar 173 and the plate 167. At the end of the stop rod opposite the lug 163 is a cushion 179 made of a durable urethane material. The cushion 179 is adjustably held to the stop rod by a washer and nuts 180. The locations of the collar 173 and the cushion 179 are chosen to provide positive stops for the headgate 13 at the ready open and exit open modes, respectively. Specifically, rotation of the headgate in the direction from the closed mode to the ready open mode is limited by the contact of the sealing washers with the plate 167, and rotation of the headgate in the direction from the closed mode to the exit open mode is limited by contact of the cushion 179 with the bumper 171. The resiliency of the cushion material prevents bounce-back of the gates at the exit open mode.

CABLE MECHANISM

To actuate the control mechanism 14 from a milking station at a divider 11, each stall module 8 of the present invention further includes the cable mechanism 85. With particular attention to FIGS. 1, 7, 8, and 14, the cable mechanism comprises a long flexible push-pull cable 136, a clevis 138, a link 142, a post 145, and a linkage rod 147. The cable 136 may be entirely conventional, such as is manufactured by the Cable Control Division of Tuthill Corporation of Tacoma, Wash.

One end of the cable 136 is installed within a divider 11. The cable passes in any convenient manner to and is guided through the plate 24 of the frame 7 and through the adjacent end wall 28 of the housing 21. The second end of the cable is attached to the clevis 138, which, in turn, is pivotally connected to one end 149 of the link 142. The link is supported for rotation about a horizontal axis 151 by the post 145. The post 145 is held to the side wall 111 of the housing 21, as by a screw 153. The axis 151 is defined by a shoulder screw 157 screwed into the opposite end of the post as the screw 153. As illustrated, the clevis 138 is connected to the end 149 of the link 142 by one end of the linkage rod 147 and an associated cotter pin 159. The second end of the linkage rod is connected to the tab 129 of the h-shaped lever 83, where it is retained in place by a cotter pin 161.

To pivot the first actuating angle 79 to its actuated condition (FIG. 11) and thereby enable the gates 31 and 33 to rotate from the closed mode to the ready open mode, the farmer actuates the cable mechanism 85. As illustrated, the farmer pushes a hand knob 131 (FIG. 1) of the cable 136 to thereby tilt the h-shaped lever 83 in the direction of arrow 132 to a first actuated attitude thereof, FIG. 11. Tilting the lever 83 to its first actuated attitude causes the cross leg 130 thereof to contact the leg 107 of the first actuating angle 79 and pivot the first actuating angle to its actuated condition of FIG. 11. For clarity, FIG. 11 is shown as having a space between the lever leg 130 and the actuating angle leg 107, but in actuality the lever and actuating angle are in contact.

As soon as the tabs 36 of the gates 33 and 35 have rotated past the raised latch 75, the farmer can release the hand knob 131 of the cable 136. Upon doing so, gravity causes the latch 75 to rotate in the direction of arrow 98 back to its lowered position, FIG. 9. That action causes the finger 101 to pull the leg 109 of the first actuating angle 79 and pivot the first actuating angle back to its normal condition. The first actuating angle, in turn, tilts the lever 83 back to its normal attitude. Although not shown, springs can be employed to bias the lever to its normal attitude, if desired.

The headgate 13 can be readily returned to its closed mode from the ready open mode merely by pushing the gates 31 and 33 in the directions of arrows 42 of FIG. 5A. When the gate tabs 36 approach the latch 75, which at that point is in its lowered position of FIG. 9, the tabs strike the latch underside 133 and cam it in the direction of arrow 100. That action also raises the finger 101 within the hole 116, but there is no effect on the first actuating angle 79. As soon as the gate tabs rotate past the latch free edge 89, the latch rotates by gravity to its lowered position of FIG. 9. The gates are then again locked in the closed mode.

To pivot the second actuating angle 81 to its actuated condition and thereby enable the gates 31 and 33 to rotate to the exit open mode from the closed mode, the farmer actuates the cable mechanism 85 by pulling the hand knob 131 on the cable 136. That action tilts the lever 83 counterclockwise, arrow 134, with respect to FIG. 10 to a second actuated attitude of FIG. 12. As the lever tilts, its cross leg 130 contacts the normally vertical leg 121 of the second actuating angle and pivots that actuating angle.

As soon as the gate tabs 36 have been forced past the free edge 89 of the latch 77, the farmer releases the cable hand knob 131. Gravity then rotates the latch 77 to its lowered position. Simultaneously, the latch pulls on the second finger 103 to pivot the second actuating angle back to its normal condition of FIG. 9. The lever 83 also tilts back to its normal attitude.

Because of the one degree angle of the axes of rotation 55 of the gates 31 and 33 relative to the vertical within the plane 39, the gates automatically start to rotate by gravity without external assistance toward their closed mode from the exit open mode. After the gates have rotated a few degrees, the second angle of six degrees of the axes of rotation 55 cause the gate to continue to rotate toward the closed mode. As the gates approach the closed mode, the gate tabs 36 contact the underside 135 of the latch 77 to cam it upwardly and out of the way as the gates approach the closed mode from the exit open mode.

An important aspect of the present invention is that the cable mechanism 85 can be installed in a stall module 8 such that its operation by the farmer is the same regardless of the divider 11 in which the cable 136 and hand knob 131 are located. In FIGS. 1, 7, 8, and 14, the cable mechanism 85 is shown as being installed in a divider that is to the left of a stall 2 looking in the downstream direction 17. In that situation, as described previously, the farmer pushes the hand knob to release the gates 31 and 33 to rotate to the ready open mode, and pulls the hand knob to allow rotation of the gates to the exit open mode. In some situations, it may be more convenient to install the cable 136' and hand knob 131' in the divider that is to the right of the stall. If the cable 136' were connected directly to the lever 83 of the control mechanism 14, the farmer would have to pull the cable hand knob 131' to release the gates to rotate to the ready open mode, and push the hand knob to allow rotation of the gates to the exit open mode. That is, actuation of the control mechanism by the cable mechanism would be reversed depending on the side of the stall in which the cable and hand knob were installed.

To provide consistent actuation of the control mechanism 14 by the cable mechanism 85, a reversing mechanism 183 in the form of the link 142 and associated components as previously described are provided. As described, the assembly of the cable mechanism is suitable for actuation from a left divider 11. For installation of the cable 136' and hand knob 131' in a right divider, the link, post 145, and clevis 138 are moved to the right of the control mechanism 14 of FIGS. 1, 7, 8, and 14. In addition, the clevis is rotatably joined to the second end 181 of the link. In that manner, the same cable can be used, and the operation of the cable mechanism as experienced by the farmer is the same regardless of the stall in which the cable and hand knob are installed.

HEADGATE EXIT OPEN MODE TO READY OPEN MODE OPERATION

Further in accordance with the present invention, the gates 31 and 33 are capable of rotating from the exit open mode all the way to the ready open mode without stopping and becoming locked at the closed mode. Looking at especially at FIGS. 9–11, a pawl 137 is incorporated into the connecting bar 74, which preferably is made from a rectangular tube. The pawl 137 is held between the two side walls of the connecting bar by a pin 139 for pivoting in a vertical plane within a slot 144 in the connecting bar bottom wall 140. Gravity tends to rotate the pawl in a clockwise direction with respect to FIG. 10 about the pin 139. Clockwise pivoting of the pawl is limited by a stop pin 141 pressed into the pawl and able to contact the connecting bar bottom wall 140. When the gates are in the closed mode, the pawl is located over the first actuating angle 79. In that situation, the pawl rests on the vertical leg 107 of the first actuating angle against clockwise rotation about pin 139 due to gravity.

In FIG. 11, the pawl 137 and the connecting bar 74 are shown in the same location as in FIG. 10, even though the control mechanism 14 has been actuated by the farmer to enable the gates 31 and 33 to rotate toward the ready open mode from the closed mode. In actuality, the connecting bar and pawl remain in their respective locations shown in FIG. 11 only for an instant after cable mechanism actuation. Because the gate tabs 36 constantly push by gravity against the latch 75, as soon as that latch is rotated to its raised position by the tilting of the lever 83, the gates start to rotate. Simultaneously, the connecting bar 74 and pawl 137 start to translate generally in the direction of arrow 76.

In FIG. 12 the pawl 137 and the connecting bar 74 are shown at their respective locations when the gates 31 and 33 are in their closed mode even though the control mechanism 14 has been actuated to enable the gates to rotate to the exit open mode from the closed mode. It will be recalled that the gates do not automatically rotate by gravity to the exit open mode from the closed mode merely because the control mechanism is actuated to the condition of FIG. 12. That is because the six degree angle of tilt of the gates causes them to automatically rotate by gravity only toward the ready open mode from the closed mode; a positive force must be exerted against the gates to rotate them to the exit open mode from the closed mode. Consequently, the connecting bar and pawl will remain in the position shown in FIG. 12 until a force is exerted on the gates to rotate them toward the exit open mode. When that force is exerted, the connecting bar translates, as mentioned previously, in the general direction of arrow 78.

Now turning to FIGS. 13A–13D, the capability of the gates 31 and 33 to rotate all the way from the exit open mode to the ready open mode without stopping and becoming locked at the closed mode will be described in more detail. In FIG. 13A, it will be assumed that the headgate 13 is in the closed mode. In that situation, the pawl 137 is over and rests on the vertical leg 107 of the first actuating angle 79 similar to FIG. 10. When the gates are in the closed mode, the control mechanism 14 can be actuated to enable the headgate to operate to either the ready open mode or to the exit open mode.

Actuating the control mechanism 14 to pivot the first actuating angle 79 to its actuated condition, FIG. 11, causes the headgate 13 to automatically rotate by gravity to the ready open mode. Accordingly, the pawl 137 reaches the location relative to the first actuating angle 79 as shown in FIG. 13B. FIG. 13B also shows the first actuating angle returned to its normal condition after the cable mechanism 85 is released. When the headgate is pushed back to the closed mode, the pawl is ramped back about the pin 139 by the actuating angle 79 to its location shown in FIG. 13A. Consequently, the pawl and first actuating angle are again at their respective locations shown in FIG. 13A when the headgate is back at its closed mode.

Actuating the control mechanism 14 to pivot the second actuating angle 81 to its actuated condition, FIG. 12, enables the headgate 13 to be pushed to the exit open mode. The pawl 137 then attains the location relative to the first actuating angle 79 as shown in FIG. 13C.

In FIG. 13A, dimension x represents the distance the connecting bar 74 and the pawl 137 must travel in the direction of arrow 78 from the closed mode of the headgate 13 toward the exit open mode before the pawl leading corner 143 clears the actuating angle 79. The dimension x is preferably equivalent to approximately ten degrees of rotation of the headgate. Consequently, any rotation of the headgate less than approximately ten degrees from the closed mode toward the exit open mode has no effect on the pawl. That feature prevents a cow from backing up in the stall after she has started to walk forward until she has walked far enough to open the headgate approximately ten degrees.

Because of the compound angle of the axes of rotation 55 of the gates 31 and 33, the gates automatically rotate by gravity from the exit open mode of FIG. 13C toward the closed mode. As shown in FIG. 13D, as the pawl 137 approaches the first actuating angle 79 in the direction of arrow 76, its leading corner 143 contacts the first actuating angle vertical leg 107. Continued rotation of the gates and movement of the connecting bar 74 causes the pawl to pivot the first actuating angle clockwise with respect to the drawings, FIGS. 11 and 13D. Pivoting the first actuating angle clockwise causes it to lift the first finger 101 and first latch 75, FIG. 9, such that the latch does not stop gate rotation or lock the gates at the closed mode. Rather, the gates continue to rotate past the closed mode all the way to the ready open mode, where they are stopped by the stop mechanism 44.

OPERATION

In use, the walk-through flat barn parlor 1 is able to manage dairy cows and other large animals with minimum effort by the farmer. It will be assumed that initially the headgate 13 of a stall 2 is in the closed mode. From his workstation at a divider 11, the farmer pushes the hand knob 131 or 131' of a cable mechanism 85. The control mechanism 14 then unlocks the gates 31 and 33 to automatically rotate by gravity to the ready open mode. A cow is directed as indicated by arrows 15 to the stall. She steps from the central aisle 6 onto the stall platform 4 and walks ahead to insert her head and neck into the ready open gates. As she walks a little further ahead, her shoulders contact the gates and push them against gravity to the closed mode. The careful control of the dimension from the frame plane 9 to the vertical platform wall 10 assures that the cow walks sufficiently far in the downstream direction 17 to fully close and lock the gates while assuring that the cow is at a comfortable stance with all four feet on the platform 4. With the gates locked in the closed mode by the cooperation of the gate tabs 36 and the latches 75 and 77, the cow is constrained by its neck within the headgate. The farmer can then milk or otherwise treat the cow.

When milking is completed, the farmer pulls the cable 136 or 136' by the hand knob 131 or 131' to rotate the latch 77 to its raised position. The cows are easily conditioned by the sound of the actuating control mechanism 14 to walk ahead in the downstream direction 17. As described previously, the cow cannot back out of the headgate 13. As the cow walks ahead, she pushes the gates 31 and 33 with her shoulders and sides to the exit open mode. Since only the force of gravity is exerted by the gates on the sides of the cow, the gates are comfortable to walk through.

When the cow has fully passed the gates 31 and 33, the compound angle of their axes of rotation 55 automatically cause them to rotate by gravity back toward the closed mode. Because of the co-action between the pawl 137 and the first actuating angle 79, the gates rotate past the location of the closed mode and continue on to the ready open mode. The gates are then ready to accept the next cow without further attention from the farmer. From that point, the farmer need actuate the control mechanism 14 only when subsequent cows are ready to leave the stall 2.

In some instances, however, the cow may not be constrained by the headgate 13 after she has closed it. That can occur if the cow pushes one of the gates 31 or 33 with her nose or head rather than placing her head and neck between the gates. In that event, the gates must be reopened to the ready open mode. That is easily accomplished merely by the farmer pushing the hand knob 131 or 131' to enable the gates to rotate open by gravity back to the ready open mode, where they are again ready to accept the cow's head and neck. The adjustability provided by the clevis 166 of the stop mechanism 44 enables the gates to be properly set at the ready open mode to reliably receive the cows' head and necks.

In summary, the results and advantages of milking parlors can now be more fully realized. The walk-through flat barn parlor 1 of the present invention provides complete management of cows in a convenient and labor saving manner. This desirable result comes from using the cable mechanism 85 that operates from the farmer's normal workstation at the dividers 11, which are distant from the headgate 13. The cable mechanism selectively controls the headgate to rotate between closed, ready open, and exit open modes. Gravity acts on the headgate to automatically operate it to the ready open mode from either the closed or the exit modes. The cows themselves operate the headgate from the ready open mode to the closed mode, and from the closed mode to the exit open mode as she enters and leaves a stall 2 in a straight-ahead manner. The invention therefore greatly improves labor efficiency as measured by cows milked per unit time.

It will also be appreciated that in addition to the superior performance of the walk-through flat barn parlor 1, its construction is such that its cost is little if any greater as compared to traditional milking parlors. Since the mechanical components are simple and few in number, the need for maintenance is minimal. Another important advantage is that the adjustable and swivelable stools 29 enable the farmer to comfortably sit at his milking station without slowing the milking process.

Thus, it is apparent that there has been provided, in accordance with the invention, a walk-through flat barn parlor that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A walk-through flat barn parlor comprising:
   a. a plurality of elongated frames upstanding from a floor and extending end-to-end along a vertical plane;
   b. divider means mounted to adjacent frames for defining workstations;
   c. gate means supported by each frame for automatic operation by gravity between a closed mode whereat the gate means constrains the animal by its neck and a ready open mode whereat the gate means can accept the head and neck of an animal walking thereto from an upstream direction, and for forced operation between the closed mode and an exit open mode whereat the gate means releases the animal to walk therefrom in a downstream direction; and
   d. control means for selectively controlling the gate means from a workstation remote from the gate means to automatically operate by gravity from the closed mode to the ready open mode and for forced operation from the closed mode to the exit open mode.

2. The walk-through flat barn parlor of claim 1 wherein the gate means further operates automatically by gravity from the exit open mode to the ready open mode.

3. The walk-through flat barn parlor of claim 2 wherein the gate means comprises:
   a. first and second gates hinged to each frame for rotating about first and second axes of rotation, respectively, the first and second axes of rotation lying in a plane that makes an angle with the vertical plane directed upwardly toward the upstream direction, the gates having respective horizontal top tubes; and
   b. first and second tabs upstanding from the respective horizontal top tubes of the first and second gates.

4. The walk-through flat barn parlor of claim 3 wherein the first and second axes of rotation converge upwardly,
   so that the first and second axes of rotation make respective compound angles with the vertical plane.

5. The walk-through flat barn parlor of claim 4 wherein the control means comprises:
   a. a control mechanism assembled to the frame selectively co-acting with the first and second tabs of the first and second gates, respectively; and
   b. a flexible cable fastened to the control mechanism for being bidirectionally actuated from the workstation to selectively produce a first co-action between the control mechanism and the gate tabs that enables automatic rotation of the gates by gravity from the closed mode to the ready open mode, and second co-action between the control mechanism and the gate tabs that enables forced rotation of the gates from the closed mode to the exit open mode.

6. The walk-through flat barn parlor of claim 5 wherein:
   a. each frame comprises:
      i. a plurality of posts upstanding from the floor; and
      ii. a housing extending between and secured to the posts;
   b. each gate means further comprises first bearing means attached to selected frame posts for supporting lower ends of the first and second gates, the first bearing means comprising:
      i. a pair of brackets attached to selected frame posts, each bracket having a leg that lies in a plane perpendicular to the axis of rotation of the associated gate;
      ii. a pair of cylindrical plugs of selected bearing material; and
      iii. means for removably fastening the cylindrical plugs to associated bracket legs;
   c. each gate is formed with a cylindrical recess that fits over and is guided for rotation on an associated cylindrical plug; and
   d. the gate means further comprises second bearing means within the frame housing for journaling upper ends of the first and second gates, the first and second bearing means cooperating to define the first and second axes of rotation of the first and second gates, respectively.

7. The walk-through flat barn parlor of claim 5 wherein the control mechanism comprises:

a. actuator means assembled to the frame for being bidirectionally pivoted by the flexible cable; and b. latch means rotatingly mounted to the frame for selectively capturing and releasing the tabs of the first and second gates therebetween in response to pivoting of the actuating means by the flexible cable, so that rotation of the first and second gates about their respective axes of rotation is controlled by the cooperation of the actuator means, flexible cable, and latch means.

8. The walk-through flat barn parlor of claim 7 wherein:

a. the actuator means comprises:

i. a first actuating angle assembled within the frame for pivoting between first and second conditions;

ii. a second actuating angle assembled within the frame for pivoting between first and second conditions; and iii. lever means assembled within the frame for selectively tilting between first, second, and third attitudes in response to selected actuation of the cable means; and b. the latch means comprises:

i. a first latch mounted to the frame for rotating between first and second positions in response to pivoting of the first actuating angle; and ii. a second latch mounted to the frame for rotation between first and second positions in response to pivoting of the second actuating angle, the first and second latches being in their respective first positions to capture the tabs of the first and second gates between them and thereby lock the gates in the closed mode when the lever means is in the first attitude thereof and the first actuating angle and the second actuating angle are in their respective first conditions, the first latch being in the second position thereof and the second latch being in the first position thereof to unlock the gates for automatically rotating by gravity to the ready open mode when the lever means is in the second attitude thereof and the first actuating angle is in the second condition thereof and the second actuating angle is in the first condition thereof, the first latch being in the first position thereof and the second latch being in the second position thereof to unlock the gates to be forcibly rotated to the exit open mode from the closed mode when the lever means is in the third attitude thereof and the first actuating angle is in the first condition thereof and the second actuating angle is in the second condition thereof.

9. The walk-through flat barn parlor of claim 8 wherein the latch means further comprises:

a. a first finger joined to the first latch and having a hook that cooperates with the first actuating angle to rotate the first latch in response to pivoting of the first actuating angle; and b. a second finger joined to the second latch and having a hook that cooperates with the second actuating angle to rotate the second latch in response to pivoting of the second actuating angle.

10. The walk-through flat barn parlor of claim 8 further comprising pawl means for pivoting the first actuating angle from the first to the second conditions thereof and thereby rotate the first latch from the first to the second positions thereof when the first and second gates rotate from the exit open mode toward the closed mode, so that the first and second gates can automatically rotate by gravity from the exit open mode to the ready open mode.

11. The walk-through flat barn parlor of claim 10 wherein:

a. the gate means further comprises bar means connecting the first and second gates to each other for directing the gates to rotate together and in opposite directions; and b. the pawl means comprises a pawl pivotally held in the bar means, the pawl striking the first actuated angle to pivot it from the first to the second condition thereof when the first and second gates rotate from the exit open mode toward the closed mode.

12. The walk-through flat barn parlor of claim 7 further comprising pawl means for cooperating with the actuator means and the latch means to enable the first and second gates to automatically rotate by gravity from the exit open mode to the ready open mode.

13. The walk-through flat barn parlor of claim 4 further comprising pawl means for selectively co-acting with the control means to enable the gate means to automatically rotate by gravity from the exit open mode to the ready open mode.

14. The walk-through flat barn parlor of claim 2 wherein the control means comprises;

a. a control mechanism assembled to the frame in operative association with the gate means; and b. cable means bidirectionally actuated from the workstation for selectively actuating the control means to enable automatic operation of the gate means by gravity from the closed mode to the ready open mode and forced operation of the gate means from the closed mode to the exit open mode.

15. The walk-through flat barn parlor of claim 14 wherein the cable means comprises reversing means for enabling the cable means to consistently actuate the control mechanism means from different workstations at the divider means.

16. The walk-through flat barn parlor of claim 14 wherein the cable means comprises:

a. an elongated flexible cable installed within a selected divider means and having an actuating end proximate the workstation in the divider means and a second end; and b. a reversing mechanism connected between the flexible cable second end and the control mechanism, the reversing mechanism being selectively assemblable to the frame to enable consistent actuation of the control mechanism from the flexible cable actuating end independent of the location of the workstation at the divider means.

17. The walk-through flat barn parlor of claim 1 wherein the floor is formed as a platform upraised from an adjacent aisle, the platform having a vertical wall adjacent the aisle that is at a controlled distance from the gate means to assure that the animal walks from the upstream direction completely and comfortably onto the platform and to the gate means when the gate means is at the closed mode thereof.

18. A modular stall for managing cow traffic in a downstream direction comprising:

a. frame means lying generally along a vertical plane for defining a workstation for a person;

b. first and second gates mounted to the frame means, each gate being rotatable about a single respective axis of rotation between closed, ready open, and exit open modes, the gates being locked and lying in a second plane that makes an angle with the vertical plane directed upwardly in an upstream direction when the gates are in the closed mode, the gates being opened in the upstream direction when they are in the ready open mode, the gates being opened in the downstream direction when they are in the exit open mode; and c. control means for selectively locking the gates at the closed mode, unlocking the gates to automatically rotate by gravity from the closed mode to the ready open mode, and unlocking the gates to be pushed from the closed mode to the exit open mode, so that a cow can walk in the downstream direction to and put her head and neck through the gates when the gates are in the ready open mode and push the gates to the closed mode for locking thereat and thereby constraining the cow in place, and the control means can unlock the gates to enable the cow to walk in the downstream direction and push the gates from the closed mode to the exit open mode.

19. The modular stall of claim 18 wherein the axes of rotation of the gates converge upwardly within the second plane to thereby enable the gates to rotate automatically by gravity from the exit open mode toward the closed mode.

20. The modular stall of claim 19 wherein:
a. the second plane makes an angle of approximately six degrees with the first plane; and
b. the axes of rotation of the first and second gates converge upwardly at an included angle of approximately two degrees.

21. The modular stall of claim 18 wherein the control means comprises pawl means for cooperating with the control means to enable the gates to rotate from the exit open mode to the ready open mode without becoming locked at the closed mode.

22. The modular stall of claim 21 wherein:
a. the first and second gates have respective tabs upstanding therefrom;
b. the control means comprises first and second latches assembled within the frame means for rotating between lowered and raised positions, the gate tabs being captured between the latches when the latches are in their respective lowered positions and the gates are in the closed mode; and
c. the control means further comprises:
 i. first and second actuating angles assembled to the frame means for pivoting between respective normal and first conditions;
 ii. first and second finger means joined to the first and second latches, respectively, for rotating the latches in response to pivoting of the first and second actuating angles, respectively;
 iii. lever means assembled to the frame means for pivoting the first and second actuating angles between their respective normal and first conditions; and
 iv. cable means attached to the lever means for selectively tilting the lever means between normal, first, and second attitudes from the workstation, the latches being in their respective lowered positions to capture the gate tabs therebetween when the first and second actuating angles are in their respective normal conditions, the first latch being in the raised position thereof to release the gates to rotate to the ready open mode when the lever means pivots the first actuating angle to the first condition thereof, and the second latch being in the raised position thereof to release the gates to rotate to the exit open mode when the lever means pivots the second actuating angle to the second condition thereof.

23. The modular stall of claim 22 wherein:
a. the gates are connected to each other by a connecting bar; and
b. the pawl means comprises a pawl pivotally held in the connecting bar, the pawl co-acting with the first actuating angle to pivot it from the normal to the first condition thereof when the gates rotate toward the closed mode from the exit open mode to thereby enable the gates to rotate from the exit open mode to the ready open mode without the lever pivoting the first actuating angle.

24. The modular stall of claim 18 wherein:
a. the first and second gates have respective tabs upstanding therefrom; and
b. the control means comprises:
 i. first and second actuating means assembled to the frame means for pivoting between respective normal and actuated conditions;
 ii. first and second latch means assembled to the frame means for rotating between respective raised and lowered positions and for cooperating with each other to capture the gate tabs between them and thereby lock the gates in the closed mode when the first and second latch means are in their respective lowered positions, the first and second latch means being in their respective lowered positions when the first and second actuating means are in their respective normal conditions, the gates being released to automatically rotate by gravity to the ready open mode when the first latch means is in the raised position, the first latch means being rotated to the raised position thereof in response to the first actuating means being pivoted to the actuated condition thereof, and the gate being released to rotate to the exit open mode when the second latch means is in the raised position thereof, the second latch means being rotated to the raised position thereof in response to the second actuating means being pivoted to the actuated condition thereof; and
 iii. lever means for selectively pivoting the first and second actuating means between their respective normal and actuated conditions.

25. The modular stall of claim 24 further comprising pawl means associated with the first and second gates for pivoting the first actuating means to the actuated condition thereof when the gates rotate from the exit open mode toward the closed mode to thereby rotate the first latch means to the raised position thereof without pivoting the first actuating means by the lever means.

26. The modular stall of claim 24 wherein the control means further comprises cable means for tilting the lever means to selectively pivot the first or second actuating means.

27. A method of managing large animals comprising the steps of:
a. locking headgates in a closed mode at an animal stall;

b. actuating a control mechanism in a first manner and unlocking the headgates;

c. automatically rotating the headgates by gravity from the closed mode to a ready open mode;

d. walking an animal along a path from an upstream direction to the headgates and walking her ahead to push the headgates to the closed mode and locking the headgates at the closed mode;

e. actuating the control mechanism in a second manner and unlocking the headgates;

f. walking the animal in a downstream direction and pushing the headgates to an exit open mode; and g. automatically rotating the headgates by gravity from the exit open mode to the ready open mode.

28. The method of claim 27 wherein the step of automatically rotating the headgates by gravity from the closed mode to the ready open mode comprises the step of biasing the headgates while they are in the closed mode to rotate by gravity to the ready open mode.

29. The method of claim 28 wherein the step of automatically rotating the headgates by gravity from the exit open mode to the ready open mode comprises the steps of:

a. biasing the headgates to rotate by gravity toward the closed mode from the exit open mode;

b. connecting the headgates with a connecting bar having a pawl thereon; and c. controlling the first latch mechanism by the pawl to release the headgates for rotation to the ready open mode as the headgates approach the closed mode from the exit open mode.

30. The method of claim 27 wherein the step of actuating the control mechanism in a first manner and unlocking the headgates comprises the steps of:

a. installing a cable mechanism having an actuating end at a first workstation lying on a first side of the path and connecting the cable mechanism to the control mechanism;

b. actuating the cable mechanism at the actuating end thereof in the first manner;

c. installing the cable mechanism with the actuating end thereof at a second workstation on a second side of the path and connecting the cable mechanism to the control mechanism; and d. actuating the cable mechanism at the actuating end thereof in the first manner, so that the animals are managed from the first and second workstations by consistent actuation of the cable mechanism.

* * * * *

UNITED STATES PATENT AND TRADEMARK OFFICE
CERTIFICATE OF CORRECTION

PATENT NO. : 5,392,731
DATED      : Feb. 28, 1995
INVENTOR(S): David P. Hoppman;   Kevin L. Daleiden It is certified that error appears in the above-indentified patent and that said Letters Patent is hereby corrected as shown below:

On the title page, item [75]: Second inventor should read--

Kevin L. Daleiden
                         --.

Signed and Sealed this

Ninth Day of May, 1995

Attest:

BRUCE LEHMAN

Attesting Officer           Commissioner of Patents and Trademarks